(No Model.) 2 Sheets—Sheet 1.
H. W. HEATON.
HANDLE BAR.
No. 593,471. Patented Nov. 9, 1897.
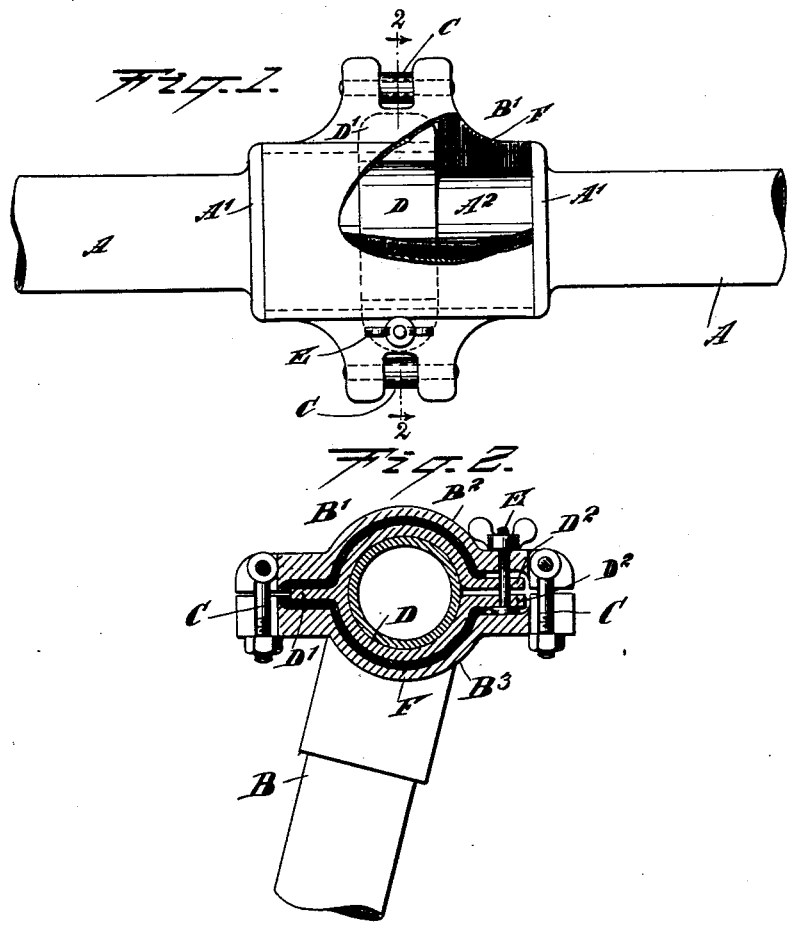
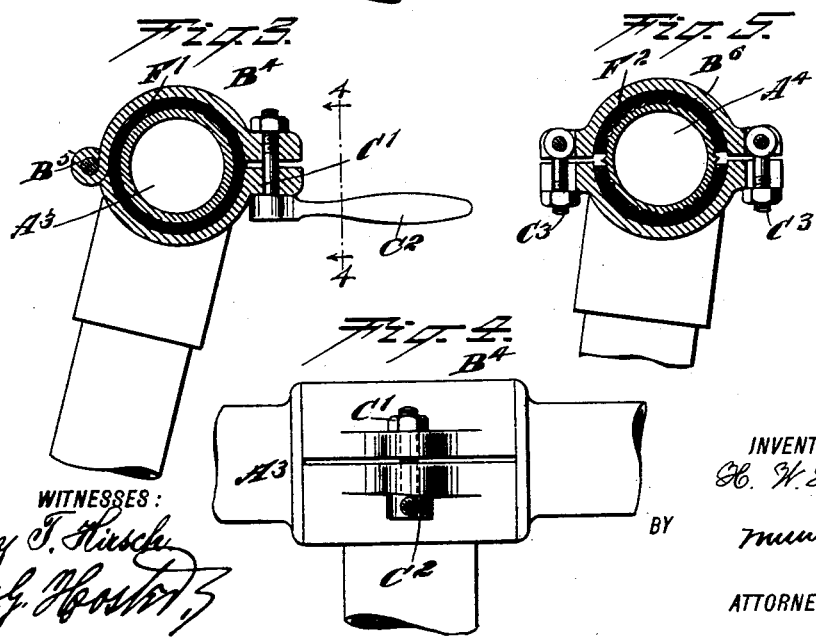
WITNESSES:
Henry T. Hirsch
Theo. G. Hoster
INVENTOR
H. W. Heaton.
BY
[signature]
ATTORNEYS.

(No Model.) 2 Sheets—Sheet 2.
H. W. HEATON.
HANDLE BAR.
No. 593,471. Patented Nov. 9, 1897.
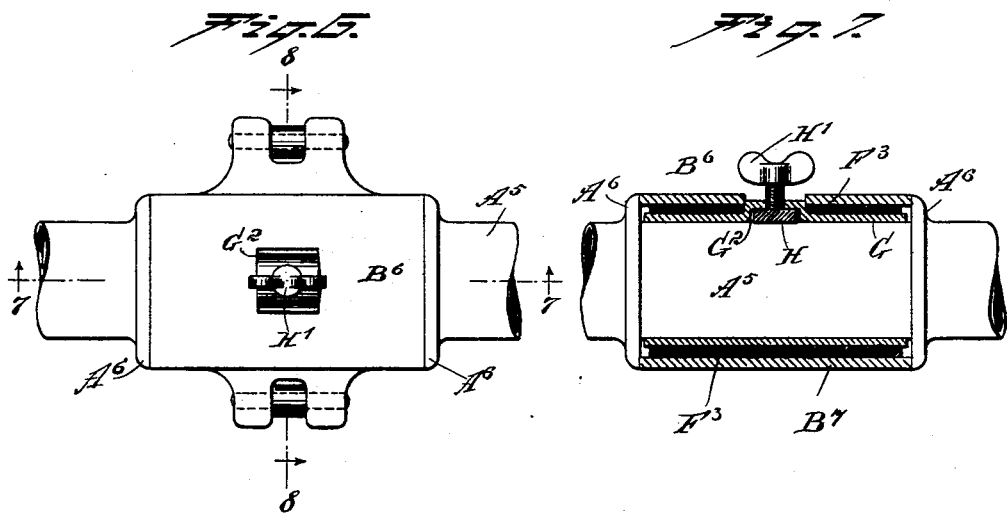
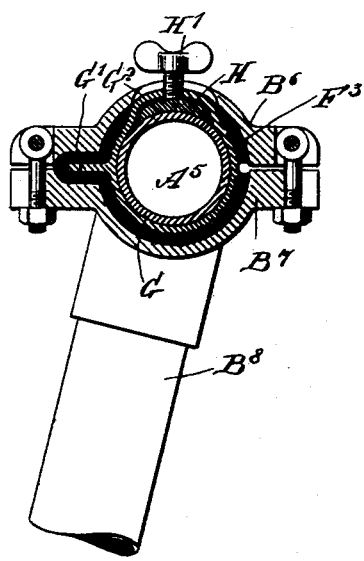
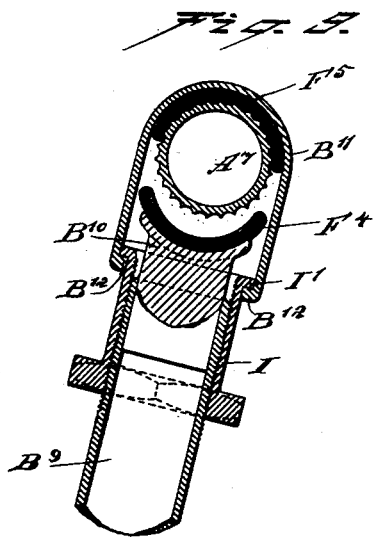
WITNESSES:
Henry T. Hirsch.
INVENTOR
H. W. Heaton
BY
ATTORNEYS.

UNITED STATES PATENT OFFICE.

HENRY W. HEATON, OF OLNEYVILLE, RHODE ISLAND.

HANDLE-BAR.

SPECIFICATION forming part of Letters Patent No. 593,471, dated November 9, 1897.

Application filed November 17, 1896. Serial No. 612,491. (No model.)

*To all whom it may concern:*

Be it known that I, HENRY W. HEATON, of Olneyville, in the county of Providence and State of Rhode Island, have invented certain new and useful Improvements in Handle-Bars, of which the following is a full, clear, and exact description.

The object of the invention is to provide certain new and useful improvements in handle-bars whereby the transmission of vibration through the handle-bar from the frame of the bicycle is reduced to a minimum to insure comfortable riding when the machine is running over rough places.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a plan view of the improvement with part broken out. Fig. 2 is a sectional side elevation of the same on the line 2 2 of Fig. 1. Fig. 3 is a similar view of a modified form of the improvement. Fig. 4 is a cross-section of the same on the line 4 4 of Fig. 3. Fig. 5 is a sectional side elevation of another modified form of the improvement. Fig. 6 is a plan view of another modified form of the improvement. Fig. 7 is a cross-section of the same on the line 7 7 of Fig. 6. Fig. 8 is a sectional side elevation of the same on the line 8 8 of Fig. 6, and Fig. 9 is a sectional side elevation of another modified form of the improvement.

The handle-bar A is provided at or near its middle with shoulders A' A', placed a suitable distance apart for the eye or head B' of the handle-bar stem B, the said head being made in sections $B^2$ $B^3$, adapted to be fastened together by eyebolts C or other suitable means. The section $B^3$ is rigid on the stem B, while the section $B^2$ of the head can be removed or loosened whenever it is desired to turn the handle-bar A and change the position of the grips.

The portion $A^2$, lying between the shoulders A' A', is engaged at or near its middle by a clamp D, preferably in the shape of a split collar, formed at one side with a lug D' and at its free end with lugs $D^2$, adapted to be drawn together by a bolt E, extending through the section $B^2$ of the head at the outside, as indicated in the drawings. The space between the portion $A^2$ and the exterior surface of the clamp D and the inside of the head B' is filled with rubber or other elastic material F, so that the vibration of the frame of the bicycle is not transmitted to the handle-bar A owing to the interposed elastic material F between the head and the handle-bar.

As illustrated in Figs. 3 and 4, the clamp D is dispensed with and the head $B^4$ of the handle-bar stem is made in two parts hinged together at $B^5$, with the free ends adapted to be closed and drawn toward each other by a handled cam $C^2$, forming the head of the bolt C'. The elastic material F' forms in this case a lining for the head $B^4$ and is interposed between the head and the bar $A^3$, so that the vibration transmitted from the frame to the handle-bar stem is taken up by the elastic material, and consequently is not transmitted to the handle-bar.

As illustrated in Fig. 5, the handle-bar $A^4$ is formed with an exteriorly-roughened surface engaged by an elastic material $F^2$, interposed between the bar and the head $B^6$, the latter being made in sections fastened together by eyebolts $C^3$ or other means.

Now it will be seen that by the arrangement described the handle-bar is firmly locked in position in the handle-bar stem upon fastening the sections of the head securely together, so that the rider can manipulate the handle-bar in the usual manner to properly steer the machine.

When it is desired to change the position of the handle-bar to elevate or depress the grips, then the fastening means for the head and the clamp D when used are loosened to permit of conveniently turning the handle-bar A in the head until the desired position is reached. When this has been done, the sections are again securely drawn together and fastened to securely lock the handle-bar firmly in place in the head.

By having the surface of the handle-bar roughened a very firm contact is obtained between the elastic material and the said handle-bar to prevent any possible turning of the handle-bar in the head, the arrangement, however, being such as to take up vibration incident to the machine passing over rough places.

It is understood that the clamp D serves as an additional means for securely locking the handle-bar A in place in the head to prevent the handle-bar from turning.

In the modified form shown in Figs. 6, 7, and 8 I fit a sleeve G on the handle-bar $A^5$ between the collars $A^6$ $A^6$, and this sleeve is provided with an external flange $G'$, which extends between the parts $B^6$ $B^7$ of the head of the handle-bar stem $B^8$, and on the top of the sleeve is formed a chamber $G^2$, containing a clamping-jaw H, engaged by a thumb-screw $H'$, screwing in the top of the chamber $G^2$ to force the jaw in engagement with the handle-bar to lock the sleeve in place on the handle-bar. The space between the sleeve and the inside of the head parts $B^6$ $B^7$ is filled with the elastic material $F^3$ to take up vibrations, as explained above in reference to the other forms. The thumb-screw $H'$ extends through an opening in the top part $B^6$ to enable the operator to loosen the jaw H, so as to permit a turning of the handle in the head. The external surface of the sleeve G may be smooth or roughened, as indicated in Fig. 8, to insure a firm adhesion of the elastic material $F^3$.

As shown in Fig. 9, the handle-bar stem $B^9$ carries at its upper end a support $B^{10}$, lined with an elastic material $F^4$, adapted to be engaged by the lower portion of the handle-bar $A^7$, extending loosely through the head $B^{11}$, made in the form of a casing and lined at the top with an elastic material $F^5$, engaging the top portion of the handle-bar $A^7$. The head $B^{11}$ is held vertically movable relative to the stem $B^9$ and is for this purpose formed at its bottom with an inwardly-extending annular shoulder $B^{12}$, engaged by the external flange $I'$ of a nut I, screwing on the handle-bar stem $B^9$ to draw the head $B^{11}$ and handle-bar $A^7$ downward to move the latter in engagement with the material $F^4$. By the arrangement described the elastic material takes up the vibrations of the stem $B^9$.

Having thus fully described my invention, I claim as new and desire to secure by Letters Patent—

1. A handle-bar, comprising a bar, a clamp for engaging the said bar, a handle-bar stem having a head inclosing the said clamp, and an elastic material between the said head and clamp, substantially as shown and described.

2. A handle-bar, comprising a bar, a clamp for engaging the said bar and having projecting ends, a handle-bar stem having a head inclosing the said clamp and made in sections, and an elastic material between the said clamp and head, substantially as shown and described.

3. A handle-bar, comprising a bar, a clamp for engaging the said bar and having projecting ends, a handle-bar stem having a head inclosing the said clamp and made in sections, an elastic material between the said clamp and head, and means for drawing the head-sections together and clamping the several parts firmly in place, substantially as shown and described.

4. A handle-bar, comprising a bar, a handle-bar stem having a head formed of two sections, means for securing the sections together, a split collar or sleeve on the handle-bar within the head and having at one side a lug extending between the projecting members of the said sections, means for clamping the said collar or sleeve to the handle-bar, and an elastic material between the collar or sleeve and the sections of the head, substantially as described.

5. A handle-bar, comprising a bar having spaced shoulders, a handle-bar stem having a head formed of two sections, the length of which is equal to the distance apart of the shoulders of the bar, a clamp engaging the bar midway between the shoulders thereof and provided at one side with a lug extending between the projecting members of the said sections, and an elastic material between the head and the handle-bar and clamp, substantially as described.

6. The combination with a handle-bar provided with shoulders, of a collar or ring surrounding the handle-bar midway between the shoulders thereof and provided with a lug at one side and two lugs at the opposite side, elastic material surrounding the collar or ring and handle-bar between its shoulders, a head formed of two sections, means for clamping the sections of the head together, and a bolt extending through the two lugs of the collar or ring and one of the sections of the head and having a nut on its end, substantially as herein shown and described.

HENRY W. HEATON.

Witnesses:
WILLIAM A. CARROLL,
CHRISTOPHER M. LEE.